US007882238B2

(12) United States Patent  
Burns et al.

(10) Patent No.: US 7,882,238 B2  
(45) Date of Patent: Feb. 1, 2011

(54) USING BLUETOOTH TO ESTABLISH AD-HOC CONNECTIONS BETWEEN NON-BLUETOOTH WIRELESS COMMUNICATION MODULES

(75) Inventors: Gregory Burns, Seattle, WA (US); Richard A. Dolf, Seattle, WA (US); Todd R. Malsbary, Seattle, WA (US)

(73) Assignee: QUALCOMM Incorporated, San Diego, CA (US)

( * ) Notice: Subject to any disclaimer, the term of this patent is extended or adjusted under 35 U.S.C. 154(b) by 988 days.

(21) Appl. No.: 11/483,214

(22) Filed: Jul. 7, 2006

(65) Prior Publication Data

US 2007/0011335 A1  Jan. 11, 2007

Related U.S. Application Data

(60) Provisional application No. 60/697,870, filed on Jul. 8, 2005.

(51) Int. Cl.
*G06F 15/16* (2006.01)

(52) U.S. Cl. .................................. 709/227; 709/239

(58) Field of Classification Search .................. 709/227, 709/239
See application file for complete search history.

(56) References Cited

U.S. PATENT DOCUMENTS

2003/0046413 A1* 3/2003 Sakakura .................... 709/229
2003/0149874 A1* 8/2003 Balfanz et al. .............. 713/168
2004/0090924 A1* 5/2004 Giaimo et al. .............. 370/252
2004/0133692 A1* 7/2004 Blanchet et al. ............. 709/230
2006/0234631 A1* 10/2006 Dieguez ..................... 455/41.2
2006/0242346 A2* 10/2006 Vuong ........................ 710/302
2007/0115819 A1* 5/2007 Stephens et al. ............. 370/230
2009/0067328 A1* 3/2009 Morris et al. ............. 370/230.1

OTHER PUBLICATIONS

Foley, Mike "Bluetooth SIG to Work With UWB" Internet Round Table Discussion.

* cited by examiner

*Primary Examiner*—Patrice L Winder
*Assistant Examiner*—Ebrahim Golabbakhsh
(74) *Attorney, Agent, or Firm*—Timothy F. Loomis; Espartaco Diaz Hidalgo

(57) ABSTRACT

Using Bluetooth to provide the network management functions such as device discovery, service discovery, security negotiation, and connection establishment. Upon a Bluetooth connection being established between the Bluetooth-enabled devices an IP channel availability query is made. This is accomplished by using information request signals from the Bluetooth L2CAP protocol layer. If an IP channel is available on both the devices and the communication modules using that IP channel are compatible the devices will then establish a secondary Internet Protocol (IP) based data channel between them.

28 Claims, 3 Drawing Sheets

USING BLUETOOTH TO ESTABLISH AD-HOC CONNECTIONS BETWEEN NON-BLUETOOTH WIRELESS COMMUNICATION MODULES

CROSS-REFERENCE TO RELATED APPLICATIONS

This application is entitled to the benefit of Provisional Application Ser. No. 60/697,870 filed Jul. 8, 2005.

BACKGROUND

1. Field

Bluetooth (BT) is a wireless communication standard used by hundreds of companies in a wide range of products. While mobile phones are the predominant user of Bluetooth, other Bluetooth product categories include desktop computing, wireless hi-fidelity audio, wireless printers, automotive telematics, digital cameras and medical devices.

The Bluetooth standard defines numerous usage models (profiles) to ensure application interoperability between products from different manufacturers. Bluetooth also defines network management protocols that enable devices to discover each other, query each other for information regarding supported services and applications and negotiate connection and security parameters. The software needed to implement these Bluetooth features is necessarily complex and requires a significant investment in software development. Makers of cell phones and many other devices are currently spending millions of dollars developing applications that leverage these standards.

2. Description of Related Art

Many devices that include Bluetooth also support other wireless technologies including 802.11a, 802.11b, 802.11g, WiMAX and Ultra Wide Band (UWB) radios. These wireless technologies frequently offer significantly greater bandwidth than Bluetooth, for example 802.11g operates at up to 54 Mbit/second versus 3 Mbit per second for Bluetooth version 2.0 with EDR, and emerging standards for UWB promise bandwidth capacities of 450 Mbit/second or greater.

Most of these other wireless technologies do not provide the detailed specifications and standards for interoperability and network management provided by Bluetooth. If applications written for Bluetooth can leverage the capabilities of other wireless technologies, device manufacturers can preserve the value of their investment in Bluetooth and bring more capable products to market sooner.

Objects and Advantages

This invention makes it possible to add alternative networking technologies into products designed for use with Bluetooth radios, with only minor modifications to the product's existing Bluetooth application. This allows the product manufacturer to make use of the greater bandwidth provided by these other networks without incurring significant development expense.

The approach in this invention is for Bluetooth to provide the network management functions such as device discovery, service discovery, security negotiation, and connection establishment in much the same way as Bluetooth operates today. Once a Bluetooth connection has been established between the two devices, the Bluetooth software will then proceed to instruct the devices to establish a secondary data channel between the two devices using higher-speed network links provided by other technologies.

SUMMARY

In accordance with the present invention an electronic device that is equipped with a Bluetooth radio and one or more other communication modules can seamlessly switch from using Bluetooth, to using the alternative communication module, with no perceivable change to the user other than a higher speed data transfer. Additionally with this invention applications that demand more bandwidth than Bluetooth alone can provide, such as wirelessly streaming high-definition video from a player to a screen become possible while benefiting from the Bluetooth ease-of-use, and standards for device to device interoperability.

This system using a Bluetooth connection protocol on a Bluetooth-enabled device initially links another Bluetooth-enabled device prior to enable communication between them using an Internet Protocol (IP) communication channel. This is accomplished by using the Bluetooth L2CAP control channel which sends an information request signal to the other Bluetooth-enabled device requesting information about an ability of the other device to open the IP communication channel to the requesting device.

This present invention contemplates the other IP communication channel being a wireless network, a wired network, a network using power circuits to communicate with other network nodes or being an infrared (IrD) network.

The present invention further includes a decision making capability deciding to use a different communication channel than an established Bluetooth channel based upon an L2CAP quality of service consideration. The quality of service consideration may be based on the available bandwidth of the communication channel. Or the quality of service consideration may be based on a latency period of the communication channel. The quality of service consideration may also be based on available range of the communication channel.

The present invention has the further capability of maintaining a persistent communication link even after the initially connected Bluetooth-enabled devices are out of Bluetooth range while still incorporating all the standard Bluetooth qualities of communication.

BRIEF DESCRIPTION OF THE DRAWINGS

The invention is further described in connection with the accompanying drawings, in which.

DESCRIPTION OF THE PREFERRED EMBODIMENT

General Description

Figure 1:
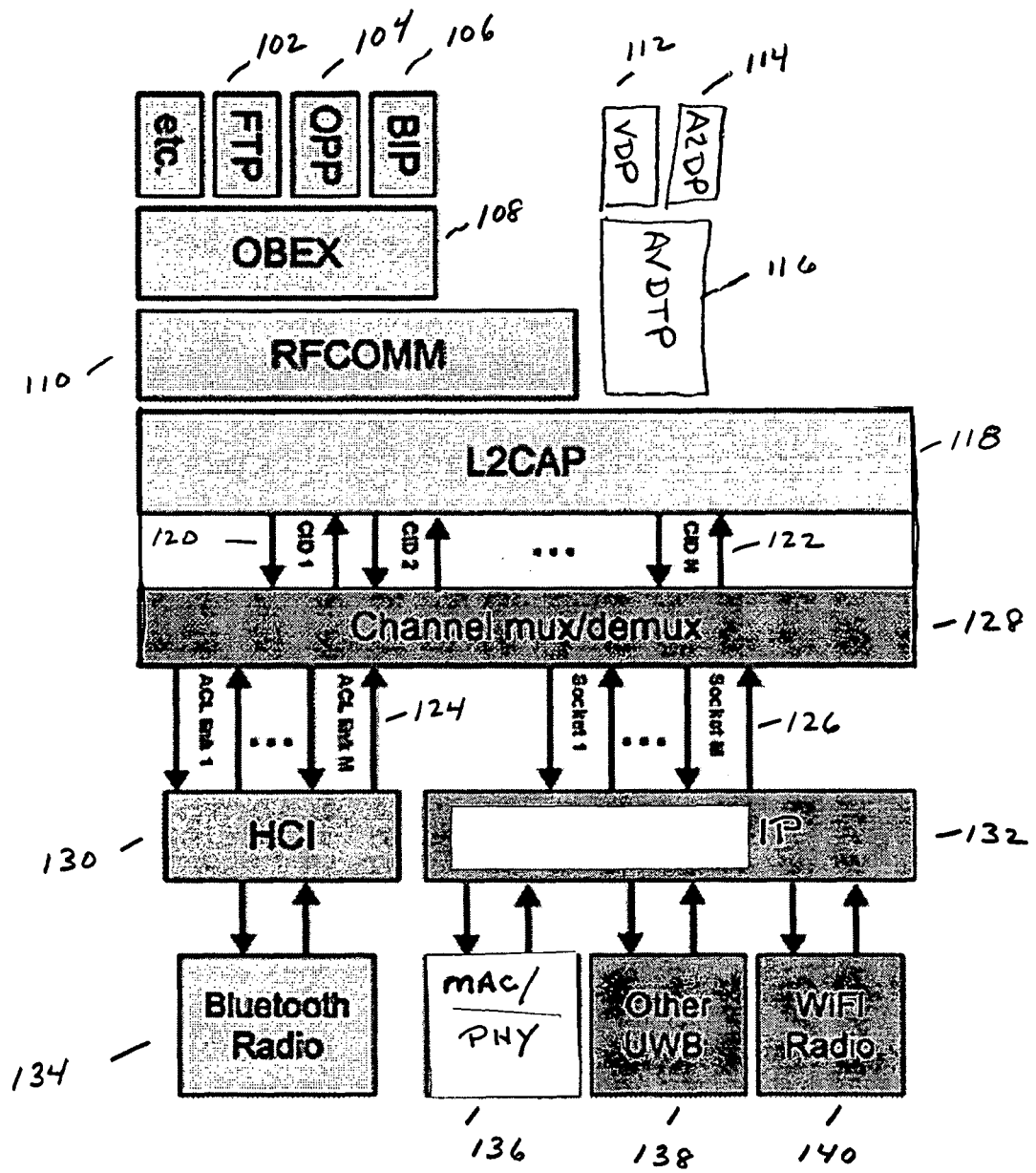
FIG. 1 illustrates a representative arrangement of the Bluetooth protocol stack.

In the following description of the various embodiments, reference is made to the accompanying drawings which form a part hereof, and which show by way of illustration various embodiments in which the invention may be practiced. It is understood that other embodiments may be utilized and structural and modifications may be made without departing from the scope of the present invention.

With the number of Bluetooth enabled devices increasing each week, the tremendous success of Bluetooth wireless technology is obvious to anyone with a mobile phone. One of the main reasons for this commercial success is Bluetooth technology's unrivaled support for ad hoc networking, enabling devices from many different manufacturers to discover each other, determine their common features, and establish secure connections "on the fly".

But even the fastest Bluetooth devices operate at data rates below 3 megabits per second. While this is perfectly acceptable for many applications it is unacceptable for applications such as high resolution image transfer or music file synchronization. This bandwidth limitation is also inadequate for transmitting conventional audio or high definition video. Other networked technologies offer significant higher data rates. WiFi for example supports data rates up to 50 megabits per second. Ultra-wide band (UWB) supports up to 400 megabits per second, with a possible capability of over 1 gigabits per second over short distances. The present invention allows Bluetooth applications to utilize these other technologies to greatly increase the inter-device data rates. This exploitation of other network technologies doesn't require any changes in the application code of the host device or changes in the user's experience.

Bluetooth technology is extremely good at ad hoc networking. This enables portable wireless devices to quickly discover each other, establish secure connections, and determine a common set of functions and features. In Bluetooth terms, these functions and features are called "profiles". Some examples of profiles are: the Basic Imaging Profile (BIP) for sending digital image files to printers; the Advanced Audio Distribution Profile (A2DP) for streaming high quality stereo audio and the related Video Distribution Profile (VDP).

Bluetooth profiles are standardized and act as the foundation for application and device interoperability. They are specified and administered by the Bluetooth Special Interest Group (SIG). Any devices that implements a Bluetooth profile must pass conformance and interoperability testing, in accordance with a formal Bluetooth qualification program. UWB and WiFi lack a comparable qualification program that specifies and mandates interoperability at the application level. By using Bluetooth as the common ground between two or more devices, the standardization of communication between the devices is already established.

The present invention operates as an extension to the embedded Bluetooth protocol stack. This addresses the need for application level interoperability between devices that support both Bluetooth and other network technologies, including but not limited to technologies such as UWB. The preferred implementation requires that the two Bluetooth devices that want to use another type of communication must share a common IP based protocol. These devices are backward compatible with standard Bluetooth devices, and can be simultaneously connected to both other Bluetooth devices without IP capabilities and to Bluetooth devices with IP capabilities. For example the Bluetooth devices that are simultaneously connected to UWB or WiFi for higher speed data communications use very little Bluetooth bandwidth while such communication takes place.

The typical Bluetooth OSI protocol stack for the communication of digital data is shown in FIG. 1. The File Transfer Protocol (FTP) 102 provides a method to transfer files without the loss of data. It can handle all types of files such as binary and ASCII text. The Object Push Profile (OPP) 104 is used by applications to push an object such as a business card or appointment information to a PDA. The Basic Imaging Profile 106 establishes the fundamental requirements to enable negotiation of the size and encoding of image-related data. The Object Exchange Protocol 108 is a set of high level protocols that controls the exchange of objects between Bluetooth devices. The RFCOMM 110 is a protocol based upon the standard for serial port emulation which has been adopted for Bluetooth. Video Distribution Profile (VDP) 112 and Advanced Audio Distribution Profile (A2DP) 114 sit on top of the Audio Video Data Transport Protocol (AVDTP) 116 which defines procedures for the establishment, initial negotiation and transmission methods for audio/video-enabled devices.

An important part of the Bluetooth protocol stack is the Logical Link Control and Adaptation Protocol (L2CAP) 118 layer. The L2CAP provides the MUX (Multiplexing Sublayer) and DEMUX capability of Bluetooth. The L2CAP establishes a Channel ID (CID) link to the MUX/DEMUX sublayer, a CID is logical connection on the L2CAP level between two devices serving a single application or higher layer protocol. This MUX/DEMUX sublayer operates over an Asynchronous Connectionless Layer (ACL) link that is provided by the baseband layer protocols. The ACL link is a point to multipoint, asynchronous (not synchronized with time), packetized (message broken into smaller packets for transmission) link between the transmitting device and the receiving device. The Host Controller Interface (HCI) upon receipt of the ACL communication link data 124 communicates the lower layer protocols to the host device (such as a BT-enabled laptop or mobile phone). It is the command interface to the baseband controller and provides uniform access to the baseband capabilities controlling the BT radio 134.

The present invention adds further capabilities to a BT-enabled device by enabling the L2CAP to communicate via, the IP link, the TCP and UDP protocols. The MUX/DEMUX layer has sockets established 126 to the TCP or UDP layer. This allows the Bluetooth-enabled devices to maintain communication with LANS, WANS, the Internet or any other IP based network.

The initial stages that two Bluetooth devices, integrated with the capabilities of other communication modules using the TCP and UDP protocols, go through are as follows.

Connection Stage: Two devices establish a standard Bluetooth radio connection using the Generic Access Profile (GAP). Depending on how the devices are configured, PIN (Personal Identification Numbers) codes may be required. A secure, encrypted connection may also be established at this time.

Bluetooth Link Stage: A Bluetooth data link is established between the applications running on each device. The device's applications begin exchanging data.

Other Communication Module Possibility: During the Bluetooth link phase, an information request is sent to the other BT device to determine if the other device supports another type of communication network such as WiFi 140, UWB 138, a Media Access Control/Physical 136 or even an Internet IP communication capability. If it does, a dialog commences to determine if both devices support the same type of communication module technology. If a common technology is supported by both devices, a data link is established using that technology. Subsequently, all data between the two devices is routed over that technology. If the other device doesn't respond to the information request, the standard Bluetooth link is used for communication, using the standard Bluetooth wireless protocols.

Other Communication Link Operation: Once the other communication module is established between the devices, the original Bluetooth link enters a low power state. This keeps the Bluetooth link active without continuously sending data.

The advantages of UWB over BT are its scalability in performance from 100 Mbps to over 2 Gbps. Ultra-Wideband systems can deliver secure wireless connections between high-quality multimedia products that aren't susceptible to interference and breaks in performance.

The usefulness of Ultra-Wideband will not just end with high-quality multimedia. It's raw high-speed performance will enable wireless to finally deliver on true device synchronization. Keeping contacts information, calendars, music and movies all in sync can be done so quickly users will to forget their content was originally on separate devices.

Unlike conventional wireless systems, which use narrowband modulated carrier waves to transmit information, Ultra-Wideband transmits over a wide swath of radio spectrum, using a series of very narrow and low-power pulses. The combination of broader spectrum, lower power and pulsed data means that Ultra-Wideband causes significantly less interference than conventional narrowband radio solutions while safely coexisting with other wireless technologies on the market.

Ultra-Wideband allows user the hope of eliminating the maze of wires connecting electronic products in their home, including large screen displays, set-top boxes, speakers, televisions, digital video recorders, PCs/laptops, digital cameras, smart phones and more. Products that include Ultra-Wideband are expected to build a home theater environment without cables, share live multimedia content between televisions, instantaneously transfer the images from a digital camera to another product quickly synchronize ultra high capacity digital audio players and share wireless video between a computer and a separate monitor.

Since a Bluetooth-enabled device using the present invention can find and establish an IP link with another Bluetooth-enabled device then an Internet connection (either wired or wireless) is possible, thereby persisting the connection regardless of where the devices eventually end up.

The preferred implementation combining BT with the possibility of an IP connection ensures that the connections are seamlessly made between devices. These BT enabled devices, in combination with another integrated communication module using an IP connection technology, can easily detect the location of other devices with the same communication capabilities, thereby maximizing both connectivity and quality of service.

The advantage of using an IP communication module with using the UWB standard, is that it features coherent processing over the entire frequency band while emitting nominal interfering noise such that for many applications it is virtually undetectable. The result is a high-quality experience without the jitter and drag we may see today in wireless media transmission.

The present invention makes it possible to add alternative networking technologies into products designed for use with Bluetooth radios, with only minor modifications to the product's existing Bluetooth application. This allows the product manufacturer to make use of the greater bandwidth provided by these other networks without incurring significant development expense.

The approach in the present invention is for Bluetooth to provide the network management functions such as device discovery, service discovery, security negotiation, and connection establishment in much the same way as Bluetooth operates today. Once a Bluetooth connection has been established between the two devices, the Bluetooth software will then proceed to instruct the devices to establish a secondary data channel, using the IP protocol, between the two devices.

To do this in a way that is transparent to the Bluetooth profile and the application layer code, is to map the secondary data channel to the Bluetooth L2CAP connection. The L2CAP signaling mechanism, used to create point-to-point and point-to-multipoint connections between the devices, is extended to allow the negotiation of the secondary data channel. Depending on the specific communication technology (e.g. 802.11, UWB, Internet etc) the appropriate information will be exchanged between the devices to establish the secondary channel and to negotiate parameters for bandwidth allocation, encryption, quality of service, and other parameters specific to the particular technology. Once the secondary channel is established, all data communication between the two devices, other than signaling, will then be diverted to the new data channel.

The Bluetooth L2CAP layer provides the framing, segmentation and reassembly functionality that is the interface between the baseband and the upper protocol layers. The L2CAP layer also establishes the data connection on behalf of the upper protocol layers. For these reasons, L2CAP is ideal point at which to multiplex the Bluetooth and other radio technologies, using Bluetooth to establish the connection and the higher speed radio to transport the data.

DETAILED DESCRIPTION

Figure 2:
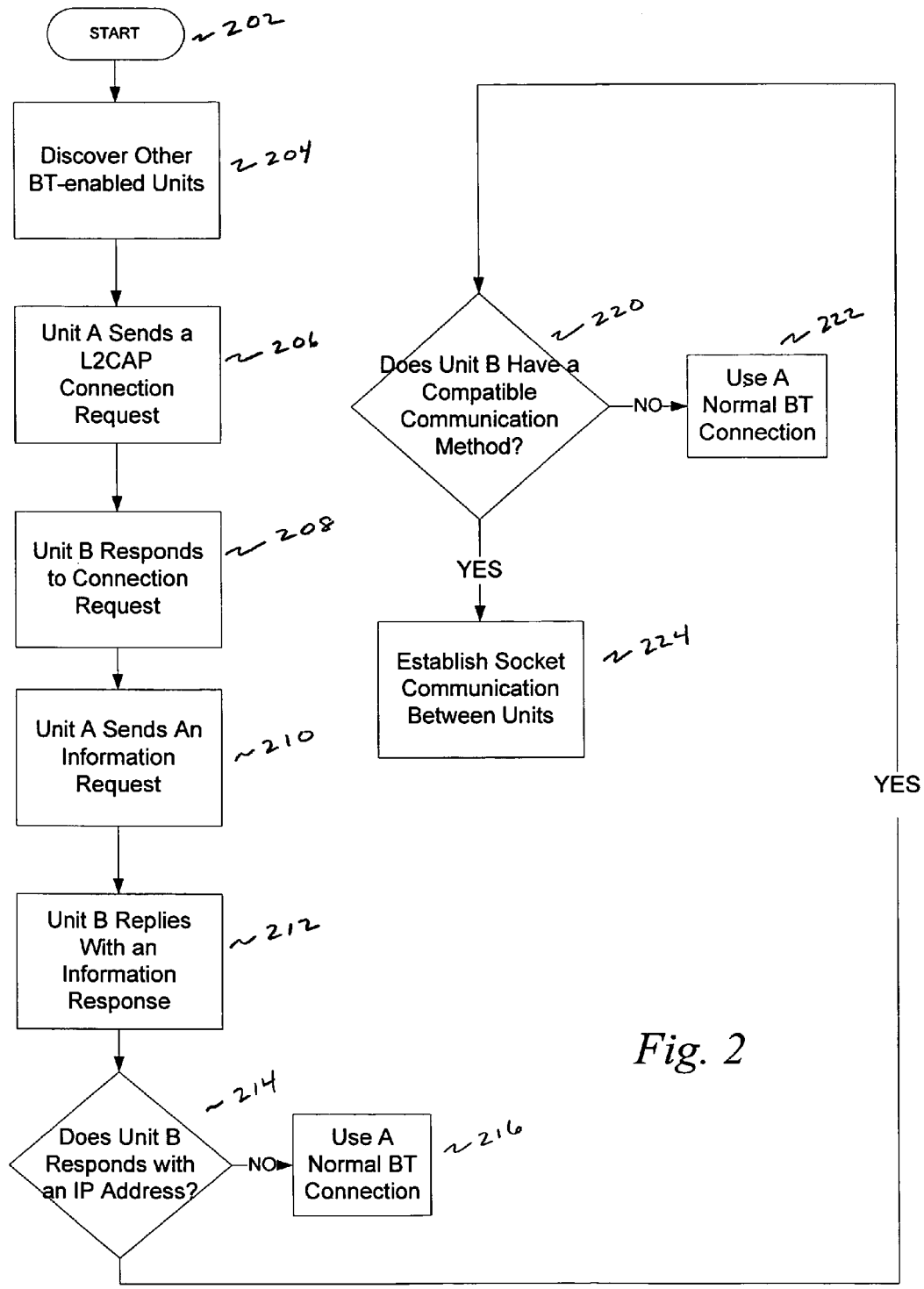
FIG. 2 illustrates an exemplary flowchart of connecting Bluetooth enabled devices to a higher speed communication method.

The steps taken to establish an IP communication link are these:

In FIG. 2 BT-enabled Unit A, when activated 202, uses a Generic Access Protocol (GAP) for discovering other Bluetooth units 204. BT-enables devices that don't conform to any other profile must conform to the GAP. This requirement ensures that any BT-enabled units, regardless of manufacture or application, can exchange information to discover which applications or services are supported. During inquiry Unit A continuously transmits a message of inquiry at different hop frequencies. BT-enabled Unit B, initially being in a low power standby mode, goes into a inquiry response mode and gives Unit A its device address and clock status. Unit A then goes into its page mode and Unit B listens for its Device Access Code to be generated by Unit A. When Unit B receives its DAC from Unit A it transmits a page received message.

Unit A then moves to exchange information with Unit B to establish a physical connection.

After the two BT units have established this BT physical communication link the two Units then move to establish a channel of communication. Unit A transmits a L2CAP_CONNECT_REQ (request) message 206 to Unit B. Unit B responds with a L2CAP_CONNECT_RSP (response) message 208. Unit A then sends an INFORMATION REQUEST 210 command to Unit B requesting that Unit B respond with information regarding the types of communication channels Unit B offers. Unit B's INFORMATION RESPONSE 212 reply may include information that Unit B possesses an IP 214 address. If Unit B's response is that it does not have an IP address then the units connect with a normal BT connection 216.

If the response from Unit B is affirmative and Unit A has a compatible communication module 220 then the L2CAP of Unit A establishes a connection to that socket (IP address and port) 224 of Unit B. If no compatible module exists then again a normal BT connection is made 222. After the IP connection is established Unit A sends a CONNECT DATA REQUEST message containing the local Channel ID (CID) and the remote Channel ID. Then a CONNECT DATA RSP message is returned from the remote unit (Unit B) over the new IP channel.

Because all Bluetooth profiles and protocols are layered on top of L2CAP, the existence of the secondary data channel will be transparent to the application code except for the increase in data throughput capabilities.

After a secondary communication channel has been established, assuming that the Bluetooth radio is not being used for connecting to other devices, the Bluetooth radio can go into a low power "sniff" mode where it is available for signaling and other uses but is consuming very little power. This effectively mitigates against the increased power consumption of using two radios simultaneously.

Higher bandwidth communication technologies will typically consume more power when transmitting data than a Bluetooth radio. In the event that the secondary data channel is no longer needed, for example a data channel for streaming video is not required because the video source has stopped or paused, the secondary channel can be temporarily suspended or put into a low power mode using L2CAP signaling packets. Similarly changes in bandwidth or other connection parameters can be communicated between the two devices to control the secondary channel.

Bluetooth has a mechanism called "scatternet" that enables a device to be a member of two or more piconets thereby providing for multi-point to multi-point networking topologies. Other types of communication modules can be used to enable some or all of these connections to utilize the secondary data channels.

Figure 3:
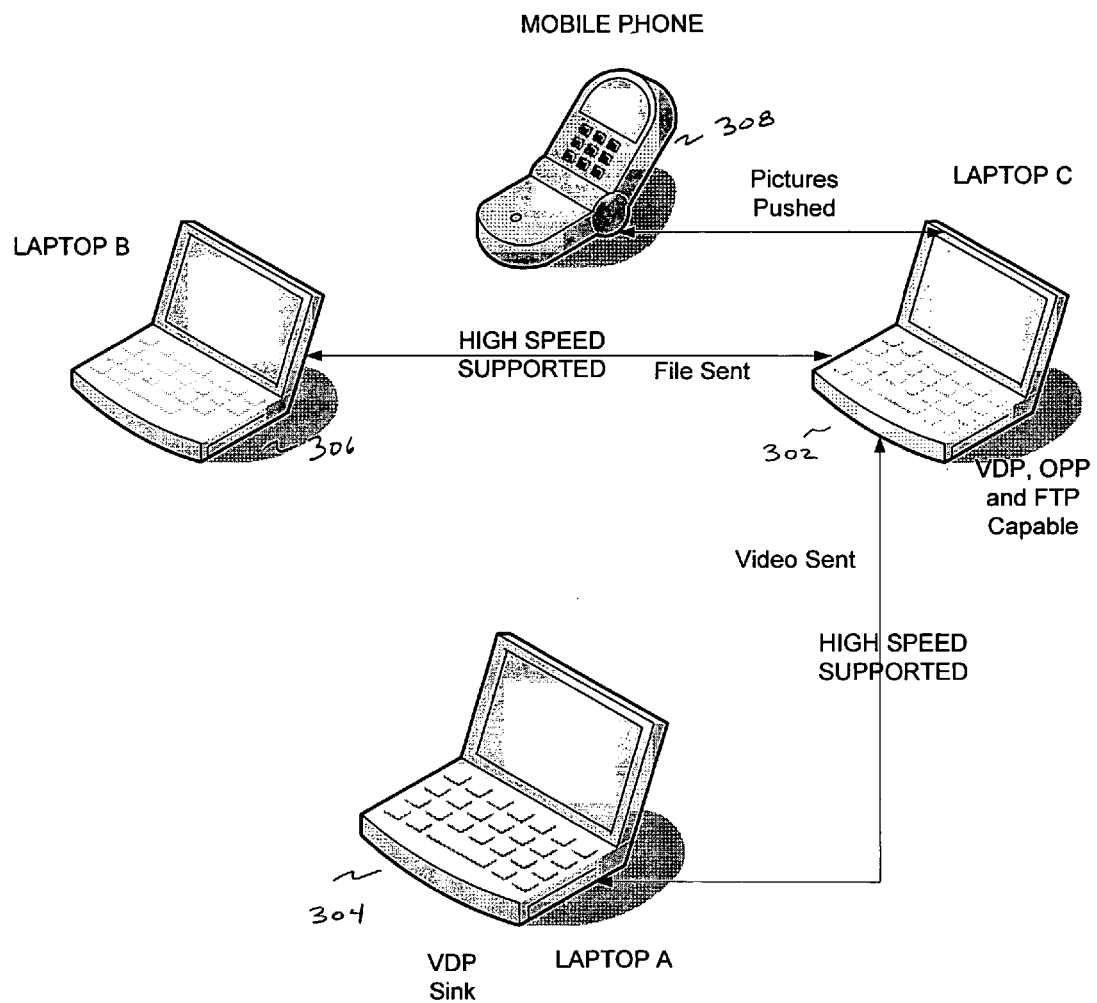
FIG. 3 is illustrating an exemplary method of using a piconet of Bluetooth enabled devices.

An example of the preferred embodiment using laptop computers and a cell phone are as follows. The preferred embodiment can have unmodified Bluetooth applications on BT enabled devices running over higher speed wireless communication channels than BT is capable of achieving. A hardware setup showing this embodiment FIG. 3 features three laptops and a mobile phone; all devices have Bluetooth radios and an alternative MAC/PHY radio or radios, such as WiFi or UWB, and have formed a single piconet.

A piconet is a collection of devices connected via Bluetooth technology in an ad hoc fashion. A piconet starts with two connected devices, such as a portable PC and cellular phone, and may grow to eight connected devices. All Bluetooth devices are peer units and have identical implementations. However, when establishing a piconet, one unit will act as a master and the other(s) as slave(s) for the duration of the piconet connection. All devices have the same physical channel defined by the master device parameters (clock and BD_ADDR). One laptop (Laptop A 304) can run the Bluetooth VDP (Video Processing Unit) sink and is connected to a large screen display, another laptop (Laptop B 306) can run a Bluetooth FTP (File Transfer Protocol), and the third (Laptop C 302) can be the piconet master and can run the Bluetooth VDP source, FTP client and an OPP (Object Push Profile) server. The piconet master 302 connects to the two other laptops, 304 and 306 and during the negotiation of the connection discovers that these laptops support an alternative MAC/PHY. The present invention is employed to establish data links using the higher speed MAC/PHY (Media Access Control/Physical) connections and reroute the Bluetooth data over these links. Except for the greatly increased data rates, the applications are completely unaware that the data is being rerouted. In the preferred embodiment scenario, after the data links are established, the Bluetooth video distribution profile of laptop 302 is used to transmit a HD video stream to the laptop 304 with the large screen display. Meanwhile, a file is transferred from laptop 302 to the another laptop 306. While video is being streamed it is also possible for files to be transferred, and pictures to be pushed to a mobile phone using OPP.

Even after the devices are moved outside of the Bluetooth range there is still an secure, encrypted if desired, communication among the devices over the IP link using a negotiated shared secret established over the Bluetooth link. All the Bluetooth functions are intact including the QoS (Quality of Service) function of the L2CAP layer. The QoS refers to the performance guarantees that may be required including delay variations, bandwidth, and latency.

An alternative embodiment will have a single BT-enabled device containing multiple types of IP communication methods or radios. This device, for example, can communicate with one device with a WiFi radio and simultaneously communicate with another device over an Internet connection.

Therefore, although the invention has been described as setting forth specific embodiments thereof, the invention is not limited thereto. Changes in the details may be made within the spirit and the scope of the invention, said spirit and scope to be construed broadly and not to be limited except by the character of the claims appended hereto.

We claim:

1. A system in a Bluetooth enabled device, wherein the system is configured to perform a method of:
   using a Bluetooth connection protocol on a Bluetooth-enabled device to initially link to at least one other Bluetooth-enabled device over a Bluetooth channel;
   sending an information request over the Bluetooth channel to said at least one other Bluetooth-enabled device to determine if the other device can open an Internet Protocol (IP) communication channel through an alternate communication module;
   receiving information from said other device over the Bluetooth channel about an ability of said other device to open the IP communication channel through the alternate communication module;
   determining if the IP communication channel through the alternate communication module can be established between the Bluetooth-enabled device and the other Bluetooth-enabled device; and
   establishing the IP communication channel through the alternate communication module if a determination is made that the IP communication channel can be established.

2. The system of claim 1 wherein the IP communication channel is a wireless network.

3. The system of claim 1 wherein the IP communication channel is a wired network.

4. The system of claim 1 wherein the IP communication channel is on a network using power circuits to communicate with other network nodes.

5. The system of claim 1 further comprising deciding to use a different communication module than an established Bluetooth module based upon a Logical Link Control and Adaptation Protocol (L2CAP) quality of service (QoS) consideration.

6. The system of claim 5 wherein the quality of service consideration is based on available bandwidth of the one or more alternate communication modules.

7. The system of claim 5 wherein the quality of service consideration is based on a latency period of the one or more alternate communication modules.

8. The system of claim 5 wherein the quality of service consideration is based on available range of the one or more alternate communication modules.

9. The system of claim 1 further configured to maintain a persistent communication link after the initially connected Bluetooth-enabled devices are out of Bluetooth range.

10. A method of using a Bluetooth connection protocol on a Bluetooth-enabled device to initially link to at least one other Bluetooth-enabled device prior to enabling communication between the at least one other Bluetooth-enabled device using an Internet Protocol (IP) communication channel and an alternate communication module, comprising:
   linking a Bluetooth-enabled device to at least one other Bluetooth-enabled device using a Bluetooth connection protocol over a Bluetooth channel;
   sending an information request to said at least one other Bluetooth-enabled device over the Bluetooth channel to determine if the other device can open an Internet Protocol (IP) communication channel through an alternate communication module;
   receiving information from said other device over the Bluetooth channel about an ability of said other device to open the IP communication channel through the alternate communication module;
   determining if the IP communication channel through the alternate communication module can be established between the Bluetooth-enabled device and the other Bluetooth-enabled device; and
   establishing the IP communication channel through the alternate communication module if a determination is made that the channel can be established.

11. The method of claim 10 wherein the IP communication channel is a wireless network.

12. The method of claim 10 wherein the 1P communication channel is a wired network.

13. The method of claim 10 wherein the IP communication channel is on a network using power circuits to communicate with other network nodes.

14. The method of claim 10 further comprising deciding to use a different communication module than an established Bluetooth module based upon an a Logical Link Control and Adaptation Protocol (L2CAP) quality of service consideration.

15. The method of claim 14 wherein the quality of service consideration is based on available bandwidth of the one or more alternate IP communication modules.

16. The method of claim 14 wherein the quality of service consideration is based on a latency period of the one or more alternate IP communication modules.

17. The method of claim 14 wherein the quality of service consideration is based on a available range of the one or more alternate IP communication modules.

18. The method of claim 10 further comprising maintaining a persistent communication link after the initially connected Bluetooth-enabled devices are out of Bluetooth range.

19. A method of establishing a non-Bluetooth communication link between first and second Bluetooth-enabled devices, comprising:
   establishing a Bluetooth protocol communication link between the first and second Bluetooth-enabled devices over a Bluetooth channel; and
   determining, by sending an information request over the Bluetooth channel, whether the first and second Bluetooth enabled devices can communicate through a non-Bluetooth communication module, wherein when the first and second Bluetooth-enabled devices can communicate through a non-Bluetooth communication module, establishing a non-Bluetooth communication link between the first and second Bluetooth enabled devices using the non-Bluetooth communication module.

20. The method of claim 19 wherein the Bluetooth protocol communication link is a Logical Link Control and Adaptation Protocol (L2CAP) link.

21. The method of claim 19 wherein the non-Bluetooth communication link is an Internet Protocol (IP) based link.

22. The method of claim 19 wherein the non-Bluetooth communication module is a WiFi module.

23. The method of claim 19 wherein the non-Bluetooth communication module is a WiMax module.

24. The method of claim 19 wherein the non-Bluetooth communication module is an Ultra-wideband (UWB) module.

25. The method of claim 19 wherein the non-Bluetooth communication module is an Ethernet module.

26. The method of claim 19 further comprising maintaining the non-Bluetooth communication link after the Bluetooth protocol communication link is terminated.

27. The method of claim 19, wherein determining whether the first and second Bluetooth enabled devices can communicate through a non-Bluetooth communication module comprises considering the quality of service (QoS) of the non-Bluetooth communication link.

28. The method of claim 27 wherein the quality of service consideration is based a Logical Link Control and Adaptation Protocol (L2CAP) based quality of service consideration.

* * * * *